United States Patent [19]

Giles

[11] Patent Number: 4,589,462

[45] Date of Patent: May 20, 1986

[54] TIRE BEAD BREAKER TOOL

[76] Inventor: John Giles, P.O. Box 70503, Marietta, Ga. 30007-0503

[21] Appl. No.: 562,112

[22] Filed: Dec. 16, 1983

Related U.S. Application Data

[63] Continuation of Ser. No. 455,299, Jan. 3, 1983, abandoned, which is a continuation of Ser. No. 202,723, Oct. 31, 1980, abandoned.

[51] Int. Cl.$^4$ .............................................. B60C 25/06
[52] U.S. Cl. .................................................. 157/1.17
[58] Field of Search ............................. 157/1.17, 1.26

[56] References Cited

U.S. PATENT DOCUMENTS 2,822,863  2/1958  Regnault .............................. 157/1.17
3,771,580  11/1973 Branick ............................... 157/1.17

FOREIGN PATENT DOCUMENTS 1081852  6/1954  France ................................. 157/1.17
1250637  12/1960 France ................................. 157/1.17

Primary Examiner—James G. Smith
Attorney, Agent, or Firm—Newton, Hopkins & Ormsby

[57] ABSTRACT

An entirely mechanical lightweight economical tire bead breaker is disclosed which can be conveniently operated with a single hand wrench. A wide variety of tire sizes can be serviced by the tool. A clamping screw and cooperating clamp bar unit forces three wedges between the tire bead and rim. The center wedge is then driven away from the rim flange to dislodge the tire bead through operation of a breaker screw.

2 Claims, 6 Drawing Figures

TIRE BEAD BREAKER TOOL

This is a continuation, of application Ser. No. 455,299, filed Jan. 3, 1983, now abandoned, which was a continuation of prior application Ser. No 202,723 filed on Oct. 31, 1980, now abondoned.

BACKGROUND OF THE INVENTION

Many tire bead breakers and tire removal tools, both manual and power-operated, are known in the prior art. Some of these devices are heavy commercial machines which are not portable and are operated by hydraulic power, pneumatics or other power means. Manually operated tools for the general purpose of the invention are also known. However, such tools generally are quite heavy and some are awkward to use, comparatively complex and unduly costly.

It is the object of this invention, therefore, to fulfill a need in the art for a simplified, manually operated, lightweight and readily portable tire bead breaker tool for use by farmers and other individuals who cannot justify the purchase of more costly machines, and yet have need for an effective tool capable of acting on a wide range of tire sizes including heavy equipment tires.

In accordance with the invention, such a simplified and efficient tire removal tool is provided which can be effectively operated with one hand wrench and which is very powerful to assure proper breakage of the bead from the tire rim. The device possess a minimum number of working parts, will not slip from its working position and is entirely safe to use. While it can be operated if desired with a power wrench, to speed up the operation, no power source other than manual power is necessary. The tool does not damage rims as do certain hammer devices and it is safer and easier to operate than hammer devices. Other features and advantages of the invention will become apparent during the course of the following detailed description.

DETAILED DESCRIPTION

Figures 1, 2, 3:
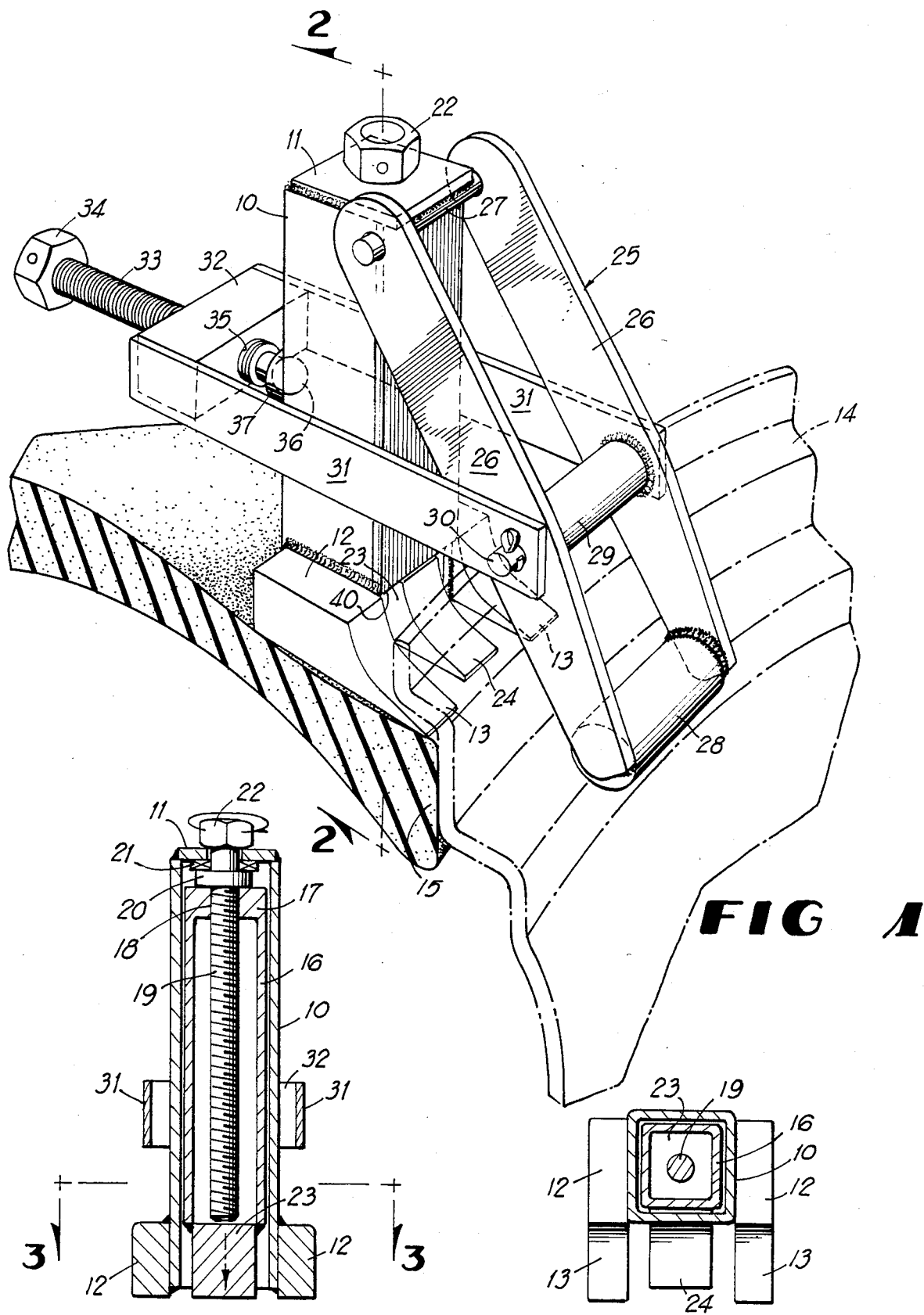
FIG. 1 is a perspective view of a tire bead breaker tool according to the invention.
FIG. 2 is a vertical section taken through the tool on line 2—2 of FIG. 1.
FIG. 3 is a horizontal section taken on line 3—3 of FIG. 2.

Referring to the drawings in detail wherein like numerals designate like parts, a tire bead breaker tool according to the invention comprises a body portion in the form of an outer rectangular sleeve 10 having a welded top plate 11 and equipped at its lower end with two side feet 12 welded thereto and having forward wedge extensions 13 for entry between a flange 14 of a tire rim and the bead 15 of the tire. The wedge extensions 13 project a substantial distance forwardly of the sleeve front wall, as shown.

Within the sleeve 10 telescopically and longitudinally movably is an inner rectangular bead breaker sleeve 16 having a thick top wall 17 provided with a central threaded opening 18, receiving a preferably left-hand screw-threaded breaker screw 19 extending centrally within the sleeve 16. The breaker screw 19 has a collar 20 fixed thereon above the wall 17 and a suitable thrust bearing 21 is provided between this collar and the top plate 11 to minimize friction. Above the top plate 11, the breaker screw has a hex head 22 for convenient engagement with a hand wrench or power wrench.

At its lower end, the inner sleeve 16 carries a welded center foot 23 similar to the side feet 12 and having a forward wedge extension 24 set back somewhat from the forward ends of wedge extensions 13, FIG. 3, to avoid interference with the rim during the operation of the tool. The foot 23 is disposed midway between the two side feet 12 and parallel therewith. The lower end of breaker screw 19 extends close to the top face of the center foot 23 when the center foot 23 is fully retracted against the lower edge 40 of the outer rectangular sleeve 10, FIG. 10, and the lower faces of the three feet 12 and 23 are then in a common plane.

The tool further comprises a clamp bar unit 25 composed of two parallel arms 26 having their top ends pivoted to the top of outer sleeve 10 by means of a welded pivot pin 27 across the front wall of the outer sleeve, as clearly shown. The opposite ends of the arms 26 carry between them a welded preferably cylindrical transverse rim-engaging clamp element 28. Near and somewhat below their midpoints, a welded spacer sleeve 29 extends between the arms 26 and receives therethrough a transverse pivot pin 30 serving to pivotally connect the clamp bar unit 25 with two side links 31 of a clamping yoke including a rear crosshead 32 welded between the rear ends of the links 31 and disposed rearwardly of the outer sleeve 10. The two links 31 straddle the sides of outer sleeve 10 and also straddle the pivoted clamp bar unit 25.

The yoke composed of links 31 and crosshead 32 is operated by a clamp screw 33 having a rear hex head 34 and being received through a central threaded bore 35 of the crosshead 32. At its forward end, the clamp screw has a ball head 36 received in a suitable swivel socket 37 welded to the rear side of outer sleeve 10.

Figure 4:
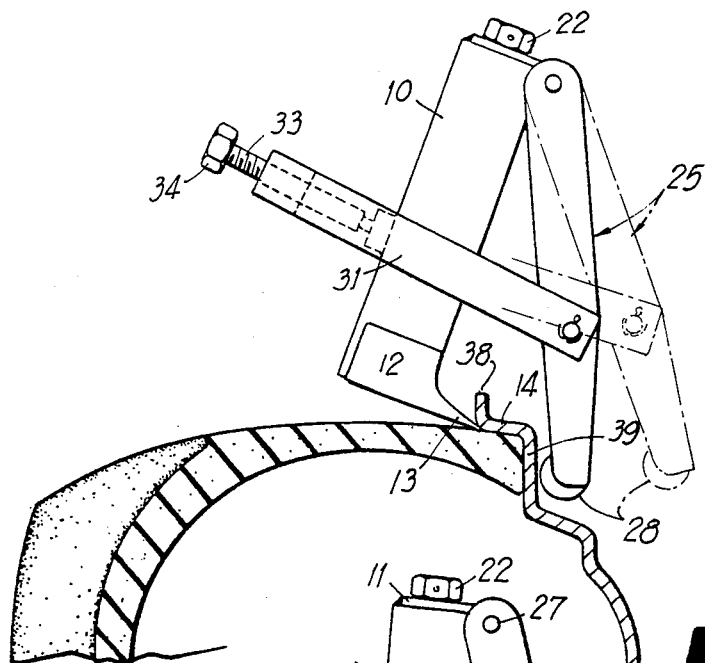
FIGS. 4, 5 and 6 are side elevational views of the tool depicting its operation.
Figure 5:
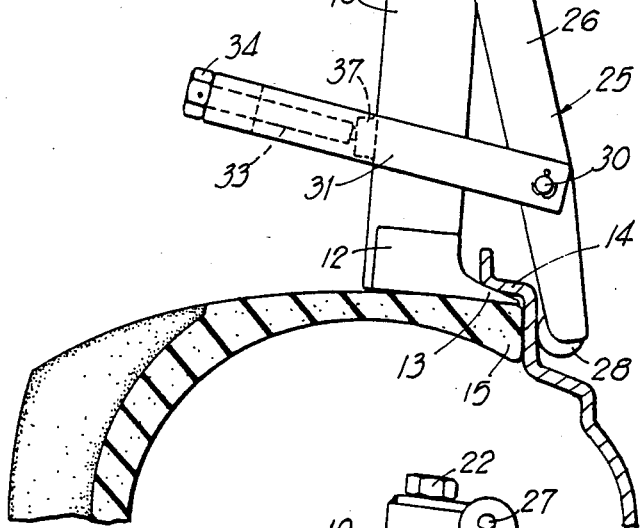
Figure 6:
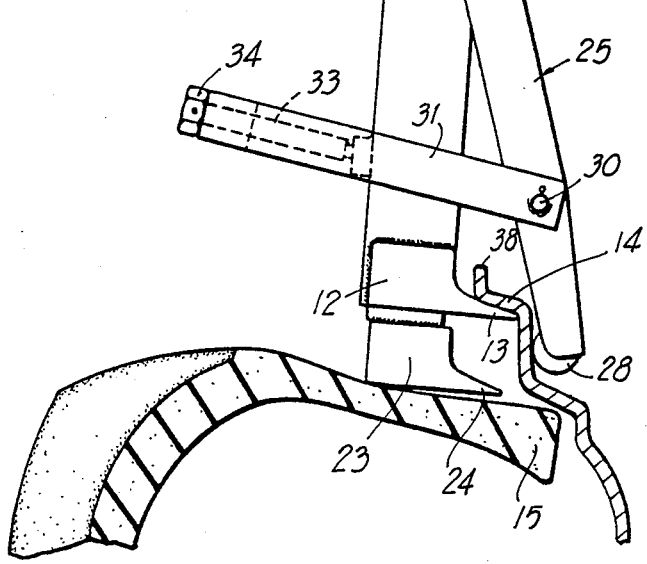

Referring to FIGS. 4 through 6, the tool operates as follows:

As shown in FIG. 4, the tool is positioned on the tire rim with the three feet 12 and 23 resting on the tire side wall and the wedge extensions 13 at the outer edge flange 38 of the rim. The center wedge extension 24 is somewhat retracted as previously noted. The clamp bar unit 25 is located by operation of the screw 33 in spread-apart angular relationship to the axis of sleeve 10 and the clamp element 28 is positioned at the interior side of the radial flange 39 of the rim.

The clamp screw 33 is now threaded inwardly by use of a hand wrench or power wrench causing the clamp bar unit 25 to swing toward parallelism with the axis of sleeve 10, FIG. 5, and the three wedge extensions 13 and 24 are forced between the tire bead 15 and rim flange 14.

Following this, FIG. 6, the tire bead 15 is forced away from its seat on the rim by operation of the breaker screw 19 through use of a manual or power wrench. The threaded engagement between breaker screw 19 and inner sleeve 16 drives the latter downwardly in the outer sleeve 10 and the center foot 23 is forced against the tire side wall close to or on the bead 15, in opposition to the holding force of the two wedge extensions 13 which are blocked by the rim flange 14. This operation assures a clean and complete breaking away of the tire bead from the rim as shown in FIG. 6. The operation can be repeated, if necessary, at several different points around the circumference of the tire.

The provision of left-hand threads on breaker screw 19 allows the operator to employ a wrench in the same manner of operation on both screws 33 and 19. That is to say, clockwise operation on both screw rotation of each screw as viewed from its headed end will draw the clamp bar unit 25 inwardly and feed the inner sleeve 16 downwardly as shown by the arrows in FIG. 2. The tool is thus characterized by convenience and ease of use and achieves all of the objectives of the invention.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. A tire bead breaker tool comprising a pair of inner and outer telescopically interfitting sleeves of polygonal cross-section adapted for relative axial movement, a breaker screw threadedly engaged with the inner sleeve to drive the inner sleeve axially of the outer sleeve and having a rotational connection with the outer sleeve, including a collar and a thrust bearing which is provided to minimize friction, a single bead breaker wedge foot on the end of the inner sleeve away from the threaded connection of said screw with the inner sleeve, a pair of rim engaging wedge feet on the corresponding last-named end of the outer sleeve in parallel straddling relationship to the single wedgefoot, a rigid rim clamp bar unit having two spaced parallel arms which are integrally connected to a spacer sleeve near their midpoints, said unit being disposed bodily on the forward side of the outer sleeve and having one end thereof pivotally attached to the outer sleeve near the end of the outer sleeve away from said wedge feet, the other end of the rim clamp bar unit carrying a cylindrical rim surface engaging element integrally connected between said arms substantially in opposing relationship to said wedge feet, a yoke formed separately from the rim clamp bar and including spaced side members straddling and extending across the outer sleeve generally at right angles to the axis of the outer sleeve, means pivotally interconnecting said clamp bar unit with said yoke near the longitudinal center of the clamp bar forwardly of the forward side of the outer sleeve and near corresponding ends of the spaced side members of the yoke, the yoke further including a crosshead integrally connected with said side members on its end away from the clamp bar unit and spaced from the rear side of the outer sleeve, a clamp bar unit operating screw threadedly engaged within the cross head and having a ball and socket rotational connection with said outersleeve and being operable to place said side members under tension and create an inherently stable condition within said yoke and draw the cylindrical rim surface engaging element into engagement with the rim.

2. A tire bead breaker tool comprising a pair of inner and outer telescopically interfitting sleeves of polygonal cross-section adapted for relative axial movement, a breaker screw threadedly engaged with the inner sleeve to drive the inner sleeve axially of the outer sleeve and having a rotational connection with the outer sleeve, a single bead breaker wedge foot on the end of the inner sleeve away from the threaded connection of said screw with the inner sleeve, a pair of rim engaging wedge feet on the corresponding last-named end of the outer sleeve in parallel straddling relationship to the single wedgefoot, a rigid rim clamp bar unit having two spaced parallel arms which are integrally connected to a spacer sleeve near their midpoints, said unit being disposed bodily on the forward side of the outer sleeve and having one end thereof pivotally attached to the outer sleeve near the end of the outer sleeve away from said wedge feet, the other end of the rim clamp bar unit carrying a cylindrical rim surface engaging element integrally connected between said arms substantially in opposing relationship to said wedge feet, a yoke formed separately from the rim clamp bar and including spaced side members straddling and extending across the outer sleeve generally at right angles to the axis of the outer sleeve, means pivotally interconnecting said clamp bar unit with said yoke near the longitudinal center of the clamp bar forwardly of the forward side of the outer sleeve and near corresponding ends of the spaced side members of the yoke, the yoke further including a crosshead integrally connected with said side members on its end away from the clamp bar unit and spaced from the rear side of the outer sleeve, a clamp bar unit operating screw threadly engaged within the cross head and having a ball and socket rotational connection with said outer sleeve and being operable to place said side members under tension and create an inherently stable condition within said yoke and draw the cylindrical rim surface engaging element into engagement with the rim.

* * * * *

UNITED STATES PATENT AND TRADEMARK OFFICE
CERTIFICATE OF CORRECTION

PATENT NO. : 4,589,462

DATED : May 20, 1986

INVENTOR(S) : John Giles

It is certified that error appears in the above-identified patent and that said Letters Patent is hereby corrected as shown below:

```
Column 1, Line 7, delete "abondoned" and insert -- abandoned --
Column 1, Line 30, delete "possess" and insert -- possesses --
Column 2, Line 15, delete "Fig. 10" and insert -- FIG. 1 --
Column 2, Line 56, after "this," insert -- FIG. 2 and --
Column 3, Line 4, delete "operation on both screw";
Column 4, Line 4, delete "outersleeve" and insert -- outer sleeve --
```

Signed and Sealed this

Thirtieth Day of December, 1986

*Attest:*

DONALD J. QUIGG

*Attesting Officer*      *Commissioner of Patents and Trademarks*